US005774576A

United States Patent [19]
Cox et al.

[11] Patent Number: 5,774,576
[45] Date of Patent: Jun. 30, 1998

[54] PATTERN RECOGNITION BY UNSUPERVISED METRIC LEARNING

[75] Inventors: Ingemar J. Cox, Lawrenceville; Peter N. Yianilos, Princeton, both of N.J.

[73] Assignee: NEC Research Institute, Inc., Princeton, N.J.

[21] Appl. No.: 503,051

[22] Filed: Jul. 17, 1995

[51] Int. Cl.$^6$ .................................................. G06K 9/62
[52] U.S. Cl. ........................ 382/160; 382/118; 382/225; 382/228
[58] Field of Search .................................. 382/160, 159, 382/224, 228, 225, 118, 124, 155, 133, 165, 170, 187, 229; 395/2.49, 20, 21, 23; 364/275.9, 468.17; 358/467; 704/231, 232, 240, 243, 245, 251, 256

[56] References Cited

U.S. PATENT DOCUMENTS

| | | | |
|---|---|---|---|
| 4,661,913 | 4/1987 | Wu et al. ................................. | 364/500 |
| 5,075,896 | 12/1991 | Wilcox et al. ........................... | 382/228 |
| 5,345,535 | 9/1994 | Doddington ............................ | 395/2.45 |
| 5,461,699 | 10/1995 | Arbabi et al. . | |
| 5,491,758 | 2/1996 | Bellegrada et al. ..................... | 382/228 |

OTHER PUBLICATIONS

T. Kanade, "Picture Processing System by Computer Complex and Recognition of Human Faces," (Ph.D. thesis), Dept. Of Information Science, Kyoto University, Nov. 1973, pp. 75–91.

Satosi Watanabe, *Frontiers of Pattern Recognition*, Academic Press, 1972.

M. Bongard, *Pattern Recognition*, Spartan Books, 1970, ISBN: 0-87671-111-2.

Laveen N. Kanal, *Pattern Recognition*, Thompson Book Co., 1968.

Piper et al., *Stein's Paradox and Improved Quadratic Descrimination of Real and Simulated Data by Covariance Weighting*, IEEE Conference Article, 1994, pp. 529–532.

K. S. Fu, *Digital Pattern Recognition*, Springer-Verlag, 1980, ISBN: 3-540-10207-8; 0-387-10207-8.

K. S. Fu, *Syntactic Pattern Reconigtion and Applications*, Prentice-Hall Inc., 1982, ISBN: 0-13-880120-7.

George C. Cheng et al., *Pictorial Pattern Recognition*, Proceedings of Symposium on Automatic Photointerpretation, Thompson Book Co., 1968.

Tzay Y. Young, *Handbook of Pattern Recognition and Image Processing*, Academic Press, Inc., 1986, ISBN: 0-12-774560-2.

*Primary Examiner*—Leo Boudreau
*Assistant Examiner*—Brian P. Werner
*Attorney, Agent, or Firm*—Philip J. Feig

[57] ABSTRACT

A pattern recognition method uses unsupervised metric learning starting from a mixture of normal densities which explains well observed data. An improved decision rule is provided for selecting the reference database element most likely to correspond to a query.

8 Claims, 1 Drawing Sheet

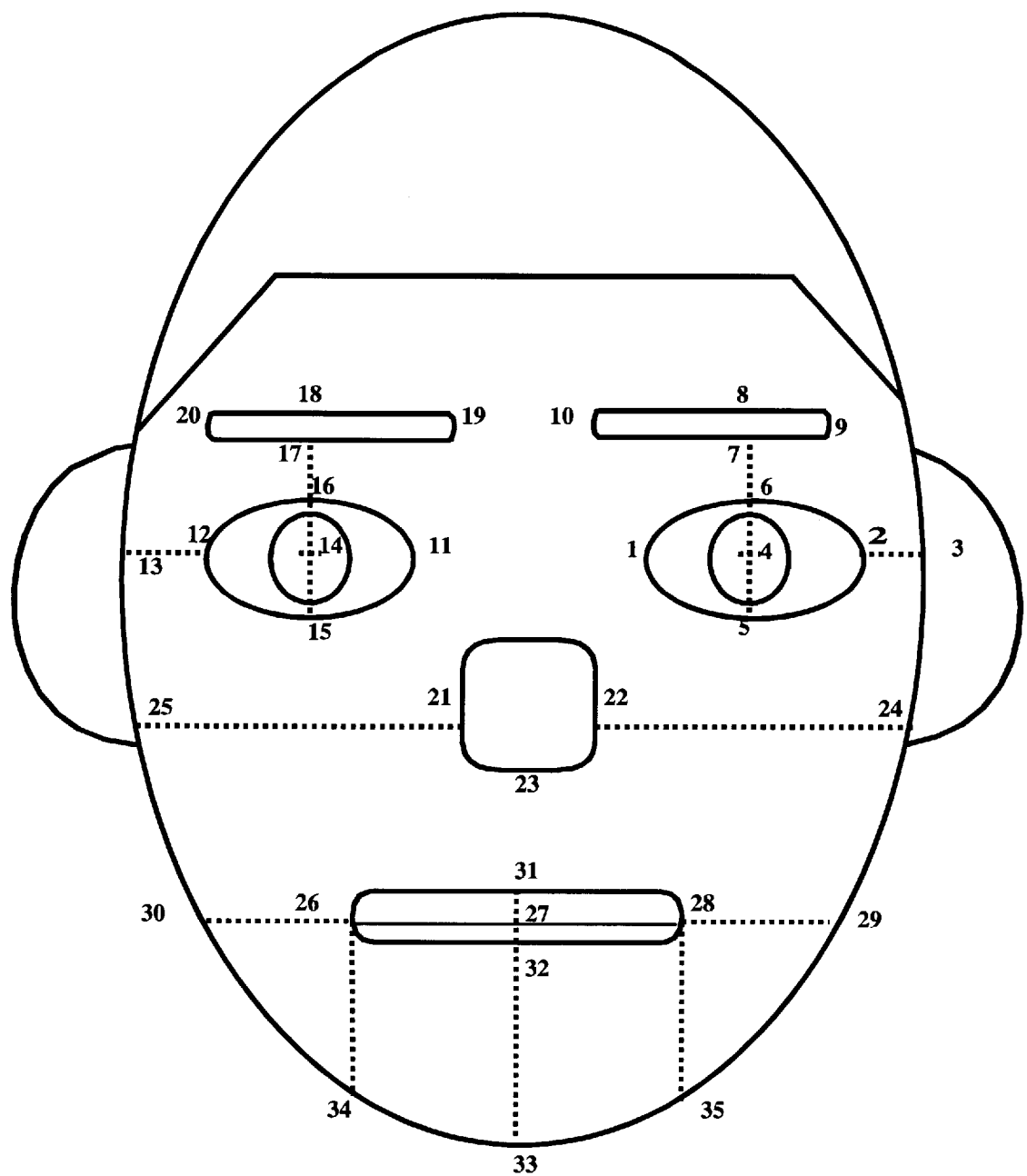

PATTERN RECOGNITION BY UNSUPERVISED METRIC LEARNING

FIELD OF THE INVENTION

The present invention relates to pattern recognition by unsupervised metric learning starting from a mixture of normal densities which explains well the observed data. In particular, the invention relates to the problem of automatic feature-based face recognition. It is relevent even in the data starved case in which the reference database contains only a single observation of each face. The invention provides an improved decision rule for selecting the reference database element most likely to correspond to a query.

BACKGROUND OF THE INVENTION

Metric learning refers to a process where given a sample from some observation space, something is inferred regarding what "distance" should mean. The observations are typically represented by vectors from a finite dimensional real vector space. In order to understand this process, two earlier approaches to pattern recognition will be described.

In a statistical pattern recognition approach, it is typically assumed that patterns are generated by some process of change operating on one or more starting points. Commonly these starting points represent vector means of object classes, and the process of change is assumed to be modeled by normal densities about these means. If many members of each class are available for training, then it is possible to estimate a me an vector and covariance matrix for each class. Combined with some prior distribution on the classes themselves, it is then straightforward to compute the a posteriori probability of an unknown vector given the model. But when few members of each class are available (perhaps only one), this approach breaks down.

In a nearest neighbor approach, it is not necessary to have a label for each point to identify nearest neighbors. But the label is used to guess the label of the query based on the labels of the neighbors. In the limit (vast amounts of data) it may be argued that the metric is unimportant—but in almost all practical problem domains the metric certainly is important. Humans for example can classify numeric digits far before they have seen enough examples so that pixel by pixel correlation yields a satisfactory result. But again, given very few members of each class, or in the entirely unsupervised case, these results do not apply and it is not at all clear what if anything can be done to choose a good metric.

One application for pattern recognition techniques is the problem of feature-based face recognition. Recently there has been renewed interest in automatic face recognition by computer. Automatic face recognition has numerous security applications ranging from identification of suspects from police databases to identity verification at automatic teller machines. While research in automatic face recognition began in the late 1960's, progress has been slow. The principal issues involve first whether to use a feature or pixel based scheme. If features are to be used, then which facial features. These facial features may be points or distance on a face or verbal or pictorial (Identikit) descriptions obtained from witnesses. Having settled on a feature vector, it is then necessary to decide which (classification method to apply. Finally, it must determine how the recognition rate scales with the size of the database and with variations in illumination, view conditions and facial expression.

Featureless recognition schemes work directly on the image with no intermediate feature extraction stage and are often referred to as pixel-based methods. Within this category are included template matching and the more recent work on eigen-faces. Template matching is only effective when the query and model images have the same scale, orientation and illumination properties. This is a very restricted regime that is unlikely to be found in many operating environments.

In principle, featured-based schemes can be made invariant to scale, rotation and/or illumination variations and it is these properties that motivated the choice of such a method. Early work in this area was first reported in which a "face-feature questionnaire" was manually completed for each face in the database. Human subjects were then asked to identify faces in databases ranging in size from 64 to 255 using 22 features. Only fifty percent accuracy was obtained. Subsequent work addressed the problem of automatically extracting facial features. Kanade, in a book entitled "Computer Recognition of Human Faces, " Berkhauser Vertex, Stuttgart, Germany, 1977, described a system which automatically extracted a set of facial features, computed a 16-dimensional feature vector based on ratios of distances (and areas) between facial features, and compared two faces based on a sum of distances. On a database of 20 faces, Kanade achieved a recognition rate of between 45–75% using automatically extracted facial features. Perhaps it was because it was perceived as difficult to automatically extract 2-dimensional facial features, significant effort has been directed towards using face profiles. In this case, the automatic extraction of features is a somewhat simpler one-dimensional problem. Recognition rates of almost 100% are claimed using a classification scheme based on set partitioning and Euclidean distance. However, these experiments did not maintain disjoint training and test sets. Subsequent work did maintain a separate test set and reported recognition accuracies of 96% on a database of 112 individuals.

SUMMARY OF THE INVENTION

The present invention concerns a method of pattern recognition in which one first discovers a statistical model which explains well the data, and then infers from this model a metric for classifying queries presented to the system.

As used herein, the term metric shall be understood to mean a conditional probability whose purpose it is to judge distance in a pattern classification system.

As used below, the symbol Q is a query vector, $\{Y_i\}$ is the database of pattern vectors and $M_k$ is the model comprising the kth element of the normal matrix.

If the statistical model consists of a mixture of multivariate normal densities, the invention defines a natural metric which amounts to an improved decision rule with which to classify queries in a pattern recognition system:

$$Pr(Q|Y_i) = \sum_k Pr(Q - Y_i|\overline{M}_k) Pr(M_k|Y_i)$$

Here $\overline{M}_k$ refers to $M_k$ adjusted to have zero mean. Other similar densities, such as mixtures of Beta densities, might be substituted for the normal densities.

In many applications a multitude of features are available but database size is limited. In these cases the simple computational expedient of multiplying the off-diagonals of each covariance by some value in (0,1) can improve performance while reducing numerical difficulties.

If the number of mixture components is not known a priori, a metric may be learned for all values within some range, and the result combined to form a single composite metric.

One application of pattern recognition is image recognition in general and facial recognition is an important subclass of image recognition. There are two interesting covariances associated with the face database. The first is the inter-class covariance which measures the degree of variation of a feature across all candidate classes, i.e. all faces. The second is the intra class covariance which measures the degree of variation of a feature within a single class, i.e. one individual's face. If it is assumed that for each class, images of an individual are normally distributed, then the intra-class covariance is clearly of interest. Several researchers have used the intra-class covariance in their calculation of the distance between a query and each model in the database. However, calculation of the intra-class covariance requires a training set in which there are many instances of an individual (class). This is rarely the case in practice, where only a single instance of each class may be present in a training set.

In this case, it is not possible to calculate the intra-class covariance. Then, an alternative model used is to assume that all faces are drawn from a single Normal population. It is straightforward to compute the average face and the inter-class covariance. Comparison of a query with a model then proceeds by comparing the difference between the query and the average and the model and the average. A Mahalanobis distance can be calculated by using the inter-class rather than the intra-class covariance.

The weakness of this strategy is illustrated by the following example. Suppose an individual feature varies greatly across classes but not within classes. Then the inter-class covariance approach will weight it lightly in forming an overall distance judgment. It might well be though that this feature alone, owing to its small intra-class variance, is sufficient to correctly classify 100% of the queries. Nevertheless experiments suggest that inter-class covariances, if carefully computed, sometimes represent a good and simple solution to the face classification problem.

The present invention will be more clearly understood when the following description is read in conjunction with the accompanying drawing.

BRIEF DESCRIPTION OF THE DRAWING

The sole FIGURE is a facial representation of points manually extracted from facial features for use in facial pattern recognition.

DETAILED DESCRIPTION OF THE INVENTION

Referring now to the FIGURE, there is shown a set of points that are extracted from facial databases. Table 1 lists a 30-dimensional feature vector computed from these facial features. All distances are normalized by the inter-iris distance to provide similarity invariance.

TABLE 1

| Feature Vectors | Distance |
| --- | --- |
| 1 | 0.5 * ((1,2) + (11,12)) |
| 2 | 0.5 * ((5,6) + (15,16)) |
| 3 | (3,13) |
| 4 | (24,25) |
| 5 | (29,30) |
| 6 | (34,35) |
| 7 | (26,34) |
| 8 | (28,35) |
| 9 | (26,28) |

TABLE 1-continued

| Feature Vectors | Distance |
| --- | --- |
| 10 | (27,31) |
| 11 | (27,32) |
| 12 | (32,33) |
| 13 | (23,31) |
| 14 | (21,22) |
| 15 | 0.5 * ((13,25) + (3,24)) |
| 16 | 0.5 * ((25,30) + (24,29)) |
| 17 | 0.5 * ((30,34) + (29,35)) |
| 18 | 0.5 * ((1,22) + (11,21)) |
| 19 | (10,19) |
| 20 | 0.5 * ((2,9) + (12,20)) |
| 21 | 0.5 * ((9,10) + (19,20)) |
| 22 | 0.5 * ((11,19) + (1,10)) |
| 23 | 0.5 * ((6,7) + (16,17)) |
| 24 | 0.5 * ((7,8) + (17,18)) |
| 25 | 0.5 * ((18,19) + (8,10)) |
| 26 | 0.5 * ((18,20) + (8,9)) |
| 27 | (11,23) |
| 28 | (1,23) |
| 29 | 0.5 * ((1,28) + (11,26)) |
| 30 | 0.5 * ((12,13) + (2,3)) |

While the table lists a preferred 30-dimension vector, it will be apparent to those skilled in the art that other feature vectors may be used for forming vectors to be used in facial recognition.

In using a database of faces as a training set, it is known that the entire database can be used to create a single class model of features. The single model then is the basis for all subsequent face recognition testing. Alternatively, at the other extreme, each individual face can be its own class, providing a set of models. Then, in subsequent pattern matching, each face feature is compared with each class (or face) in the database and the image having the closest distance matches to that of the face queried is selected.

In all attempt to cluster facial patterns into more than a single class—but with fewer classes than the number of individuals in the database, a mixture model is employed. Then an associated covariance is calculated for each cluster. Finally the distance between a query and a known face is calculated as a weighted sum of distances, one for each cluster, as described elsewhere herein. The closest match is the class into which the image is classified.

In accordance with the teachings of the present invention, groups of images having distance values in clusters, that is of substantially similar values, are formed in classes. The result is a quantity of classes greater than 1 but less than a single image in each class. The resulting classes are images of similar objects, using same covariance values.

The case just considered corresponds to the technique used in Kanade, supra, where the inverse covariance matrix is used directly from similarity judgements. The judgements made by it, are of course the same as those made by $\Sigma/2$.

It is then a natural next step to assume instead that the data is modeled by some mixture of k normal densities. After learning this mixture by some method (e.g. Expectation Maximization (EM)), proceed to compute the a posteriori probabilities:

$$Pr(M_k|Y_i) = \sum_k \frac{Pr(Y_i|M_k)Pr(M_k)}{\sum_i Pr(Y_i|M_i)Pr(M_i)}$$

Since there is no query dependency, they may be computed once for each database element and recorded for later use. Now given a pair $(Q,Y_i)$, it is possible to compute:

$$Pr(Q|Y_i) = \sum_k Pr(Q|M_k,Y_i)Pr(M_k|Y_i)$$

$$= \sum_k Pr(Q - Y_i|M_k)Pr(M_k|Y_i)$$

Assume a flat prior on the $\{Y_i\}$ these values may simply be normalized to result in $\{Pr(Y_i|Q)\}$ from which a classification can be made. As in the single mixture element case considered earlier, it is possible also to use all alternative prior on the $\{Y_i\}$.

This approach will be referred to as a form of unsupervised metric learning. Given a collection of vectors, a function is learned which given two vectors, returns the probability that the first is generated from the second. This is not a fill metric in the mathematical sense, although some of the missing properties may be supplied by modifying the definitions. It is also possible to think of this approach as obtaining a joint density from a simple set of feature vectors and strong additional assumptions.

The above description has avoided the details of learning the necessary mixture density, and in fact not mentioned is the matter of estimating the parameters of a single multi-variate normal density given little data. In practice, one may use the well known Expectational Maximization (EM) method to obtain a (locally) maximum-likelihood mixture model. In this case as well as with a single density, some form of statistical flattening is preferable if little data is available. The following is a description of a practical technique for dealing with this issue.

One convenient statistical device amounts to believing the variances before the covariances. The off-diagonal entries of $\Sigma 0$ are multiplied by some scaling factor $s \in (0, 1)$. Avoiding unity has the additional advantage of preventing ill-conditioned matrices (assuming none of the variances are near zero).

One straightforward approach to estimating s begins by fixing some discrete set of possible values in (0, 1). Many way cross validation is then used to determine how well each resulting model predicts never before seen data points in the training set. From this a distribution is inferred in a discrete set of possibilities. A mode or mix of the resulting models is then chosen using this distribution.

It should be mentioned that given enough data one might attempt to assign (different values of s to each mixture component, since some components may have many members while others have relatively few. Those with many members might be expected to work well with s values closer to unity.

One practical application of the present invention is in face recognition. It should be noted, given sufficient data and mixture models the distinction between inter-class and intra-class may vanish. In the following discussion, inter-class covariance is used.

If $z_{ij}$ and $z_{i,k}$ denote the jth and kth features in the ith class and N is the total number of individuals in the database, then the covariance is given by:

$$Cov(z_j, z_k) = \sum_{i=1}^{N} \frac{1}{N} (z_{i,j} - \tilde{z}_j)(z_{i,k} - \tilde{z}_k)$$

where $$\tilde{z}_j = \sum_{i=1}^{N} \frac{z_{i,j}}{N}$$

This covariance matrix is then modified by multiplying the off-diagonal elements by a constant $0 \leq c \leq 1$ estimated using several samples withheld from the training data. Note that due to the lack of an adequate query database, c is not estimated with withheld training data but used the query data directly. Strictly this should not be done since it allows a form of training on the test set. However, while the off-diagonal weighting could have been varied for each reported test, c is maintained fixed for all tests. An off-diagonal weighting of 0.5 provided good results though improved results of one to two percent were obtained for varying off-diagonal weightings. This crude statistical flattening technique is but one of many possible. All such techniques address the well known shortcomings of the raw sample covariance matrix given scant data.

Tests conducted using a model database of 195 total images from different sources and a query database of 95 images from certain sources, resulted in an algorithm rate of 92 correct of 95 images, or 97%.

The conclusion is that when performing face recognition experiments on several databases of various size and race, recognition rates of approximately 97%, were obtained using a 30-dimension feature vector comprising distance between various points on the face.

While facial studies have been described, the method has application for other image recognition problems, such as fingerprint identification.

While there has been described and illustrated a preferred method of performing pattern recognition, modifications and variations are possible without deviating from the broad teachings and spirit of the invention which shall be limited solely by the scope of the claims appended hereto.

What is claimed is:

1. The method of pattern recognition comprising the steps of:

estimating a metric from a mixture of multi-variate normal densities representing a statistical model of training data;

forming a matrix for each element of the mixture;

reducing off-diagonal matrix entries to produce an adjusted metric; and using said adjusted metric to classify incoming queries.

2. The method as set forth in claim 1, where said estimating a metric is $$Pr(Q|Y_i) = \sum_k Pr(Q - Y_i|\overline{M}_k)Pr(M_k|Y_i).$$

3. The method as set forth in claim 1, where said training data comprises faces.

4. The method as set forth in claim 1, where said training data comprises fingerprints.

5. The method of pattern recognition comprising the steps of:

estimating a metric from a mathematical form of a mixture of multi-variate normal densities representing a statistical model of training data;

forming a matrix for each element of the mixture;

reducing off-diagonal matrix entries to produce an adjusted metric; and using said adjusted metric to classify incoming queries.

6. The method as set forth in claim 5, where said estimating a metric is $$Pr(Q|Y_i) = \sum_k Pr(Q - Y_i | \overline{M}_k) Pr(M_k | Y_i).$$

7. The method as set forth in claim 5, where said training data comprises faces.

8. The method as set forth in claim 5, where said training data comprises fingerprints.

\* \* \* \* \*